Nov. 29, 1966 A. L. SCHERR ETAL 3,289,171

PUSH-DOWN LIST STORAGE USING DELAY LINE

Filed Dec. 3, 1962 3 Sheets-Sheet 1

INVENTORS
ALLAN L. SCHERR
CYRIL J. TUNIS

BY Leo J. Aubel
ATTORNEY

Nov. 29, 1966 A. L. SCHERR ETAL 3,289,171

PUSH-DOWN LIST STORAGE USING DELAY LINE

Filed Dec. 3, 1962 3 Sheets-Sheet 2

United States Patent Office 3,289,171
Patented Nov. 29, 1966

3,289,171

PUSH-DOWN LIST STORAGE USING DELAY LINE

Allan L. Scherr, Pikesville, Md., and Cyril J. Tunis, Endwell, N.Y., assignors to International Business Machines Corporation, New York, N.Y., a corporation of New York Filed Dec. 3, 1962, Ser. No. 241,892
8 Claims. (Cl. 340—172.5)

This invention relates to delay line circuitry and more particularly to circuitry for utilizing delay lines as "push-down" lists.

"Push-down" list comprises a storage device in which the last item, be it a bit, a character or a word, inserted into the storage device is inserted over the previous item; and, the last inserted item is the first item which can be retrieved to read out of the device. A push-down list might be considered as a rack into which items can only be inserted or deleted from the top. When a read-in operation is performed, an item is read into the push-down list and it becomes a new top item; all the previous items are pushed down one position in the rack. When a read-out operation is requested, the top item on the list is read out and removed from the list, and the remaining items in the list are pushed up one position in the rack. In other words, the operation is in a last-in-first-out, and a first-in-last-out sequence or manner.

One of the principal potential uses for a push-down list storage device would be as an aid in compiling advanced algebric languages into basic machine operations. In addition, a push-down list may be used in general as a variable length storage unit of ordered information or data, without the necessity of providing addressing equipment for preserving the state or relative positioning of the incoming data.

Delay lines have proven to be extremely useful as a recirculating or dynamic type storage device, therefore delay lines are particularly suited for use in the circuitry of a push-down list.

Accordingly, it is a principal object of the present invention to provide circuitry for utilizing a delay line as a push-down list.

It is another object of the present invention to provide a delay line circuitry which utilizes a delay line for storing bits of words in a first-in-last-out and last-in-first-out manner.

It is another object of the present invention to provide delay line circuitry for reading in and reading out information to the delay line and in which the length of line and the propagation time need not be strictly controlled to provide suitable operation.

In the attainment of the foregoing objects, circuitry is provided, for example, for recirculating bits representing characters and hence words in a delay line. A time space is included between the last word in the list and the first word in the list so that the beginning of the list can be distinguished; and, a marker bit or pulse is inserted in front of the first word in the list. The presence of the marker pulse in conjunction with the space in the list indicates that the beginning or top of the list is in position to allow the insertion or deletion of words from the delay line. This marker pulse is shifted around as words are read in and read out of the list such that as each word is read into the list, the marker pulse is inserted ahead of the newly inserted word; and as each word is read out or deleted from the list, the marker pulse is repositioned to be ahead of the next succeeding word on the list.

The foregoing and other objects, features and advantages of the invention will be apparent from the following more particular description of a preferred embodiment of the invention, as illustrated in the accompanying drawings.

Figure 2:
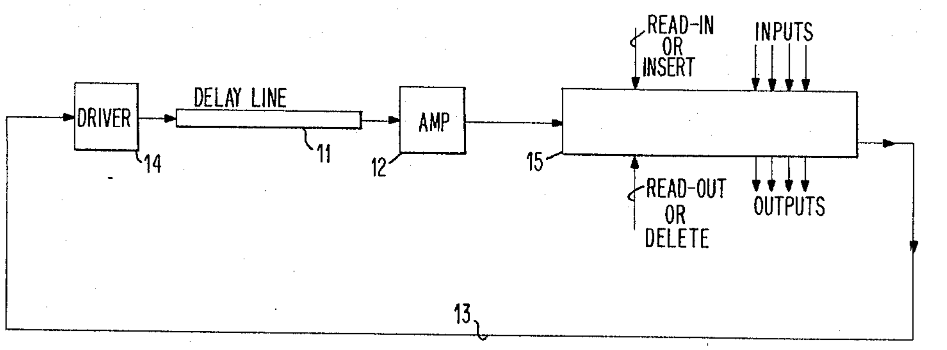
FIG. 2 is a schematic diagram illustrating a delay line system, including input and output circuitry for inserting and deleting information from the delay line in accordance with the invention; and, FIGS. 3*a* and 3*b*, with FIG. 3*b* disposed to the right of FIG. 3*a*, together show the input and output circuitry indicated in FIG. 2 in more detail.

Referring first to FIG. 2, the delay line 11 may be of any suitable type, as for example a magnetostrictive delay line comprising a length of wire formed in a configuration to provide a time delay to an input electrical pulse. As is known, an input electrical pulse is converted by a suitable known transducer, not shown, to an acoustical signal at the input of the delay line and this acoustical signal is propagated at the speed of sound through the line to the other (or output) end of the delay line where the acoustical pulse is converted to an electrical pulse by a suitable known transducer, not shown.

Suitable transducers, which may be used in the circuit of the present invention are disclosed in the application, Serial No. 192,894 of N. S. Tzannes et al. entitled "Delay Line Transducers," filed May 7, 1962, now Patent No. 3,177,450, which application is assigned to the same assignee as the present invention.

The delay line 11 might also be of glass or quartz arranged in a configuration to provide a suitable delay as also is well known in the art. The operation of the delay line circuitry of the invention is similar for either magnetostrictive, glass or quartz types of lines; and, for purposes of this discussion, it will be assumed that a magnetostrictive type of delay lines is being utilized.

Figure 1:
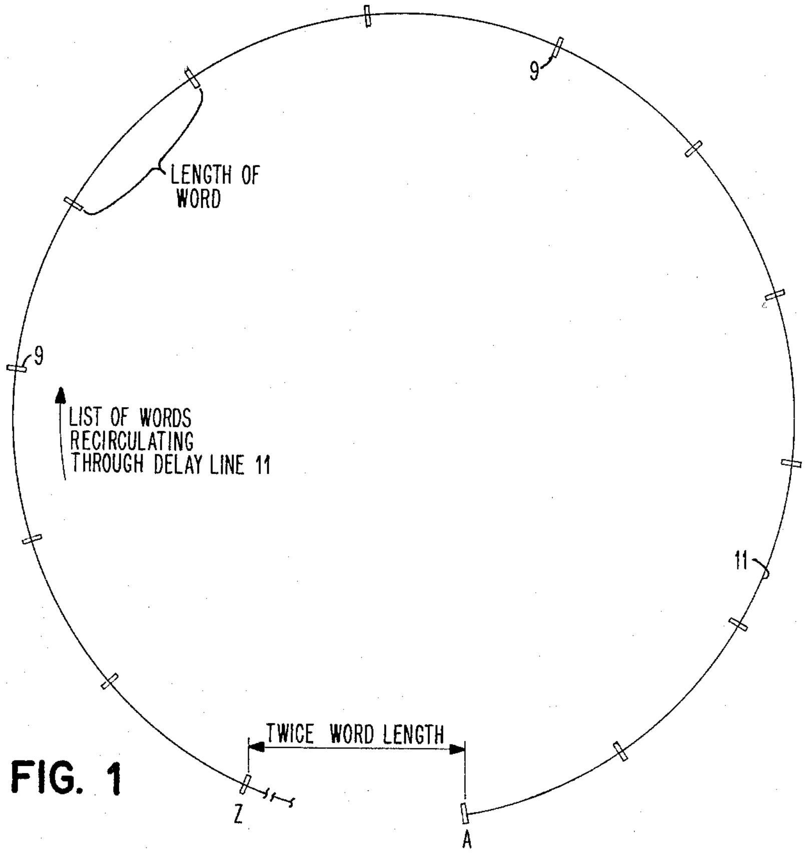
FIG. 1 is a representation of a delay line and a recirculating list of words.

Referring now to the schematic representation in FIG. 1, the beginning or top of a list of words in the delay line 11 is indicated by the letter A, and the end of the list is indicated by the letter Z. In FIG. 1, the length of the items i.e., the words in the list (each word time) are schematically indicated by the short marks 9 transversing the delay line 11. The number of bits in each word, that is, the word length is selected initially and may be of any desired length; the number of stages in the data register, to be described hereinbelow, must correspond to the number of bits in each word. Also, for control purposes to be described in more detail hereinbelow, the space between the beginning A and the end Z of the word list is arranged to be greater than two word length times. A marker pulse or a marker bit is positioned at the beginning or top of the list and every time a word is inserted or deleted from the list, control circuitry repositions the marker pulse as will also be described hereinbelow.

Referring again to FIG. 2, outputs, i.e., the output pulses or bits from the delay line 11 are connected through the transducer, not shown, and an amplifier 12, of any suitable known type, to an input-output or insert-delete circuitry 15. The output, i.e., the output pulses or bits from the input-output circuitry 15 are coupled back through lead 13 to a driver 14, also of any suitable known type, which in turn, drives the transducer, not shown, to the delay line 11. The input-output circuitry 15 will be described in more detail hereinbelow. The terms pulses and bits will be used interchangeably throughout the description.

The data consisting of bits or pulses to be stored, that is, recirculated in the delay line 11 is coupled from any suitable source in a computer such as storage registers, not shown, to the data register 25 (see also FIGS. 3*a* and 3*b*) of the input-output circuitry 15 as will be described hereinbelow; the data coupled to the input-output circuitry 15 is indicated by the arrowed lines labeled "inputs." The data coupled from the input-output circuitry 15, i.e., the output data bits, may be provided to a utilization circuit, not shown, of any suitable known type such as arithmetic units of a computer; the data coupled from the input-output circuitry 15 is indicated by the arrowed lines labeled "outputs." The input and output data pulses or bits are coupled into, and out of, the data register 25 of input-output circuitry 15 in parallel; more specifically, a complete word represented by a group of characters which are, in turn, represented by a group of bits, as is well known in the art, is inserted into or deleted from the delay line during a given time interval. The read-in or insert and read-out or delete signals indicated by the respectively labeled arrowed lines in FIG. 2 are provided to the input-output circuitry 15 as will be fully discussed hereinbelow.

Figure 3A:
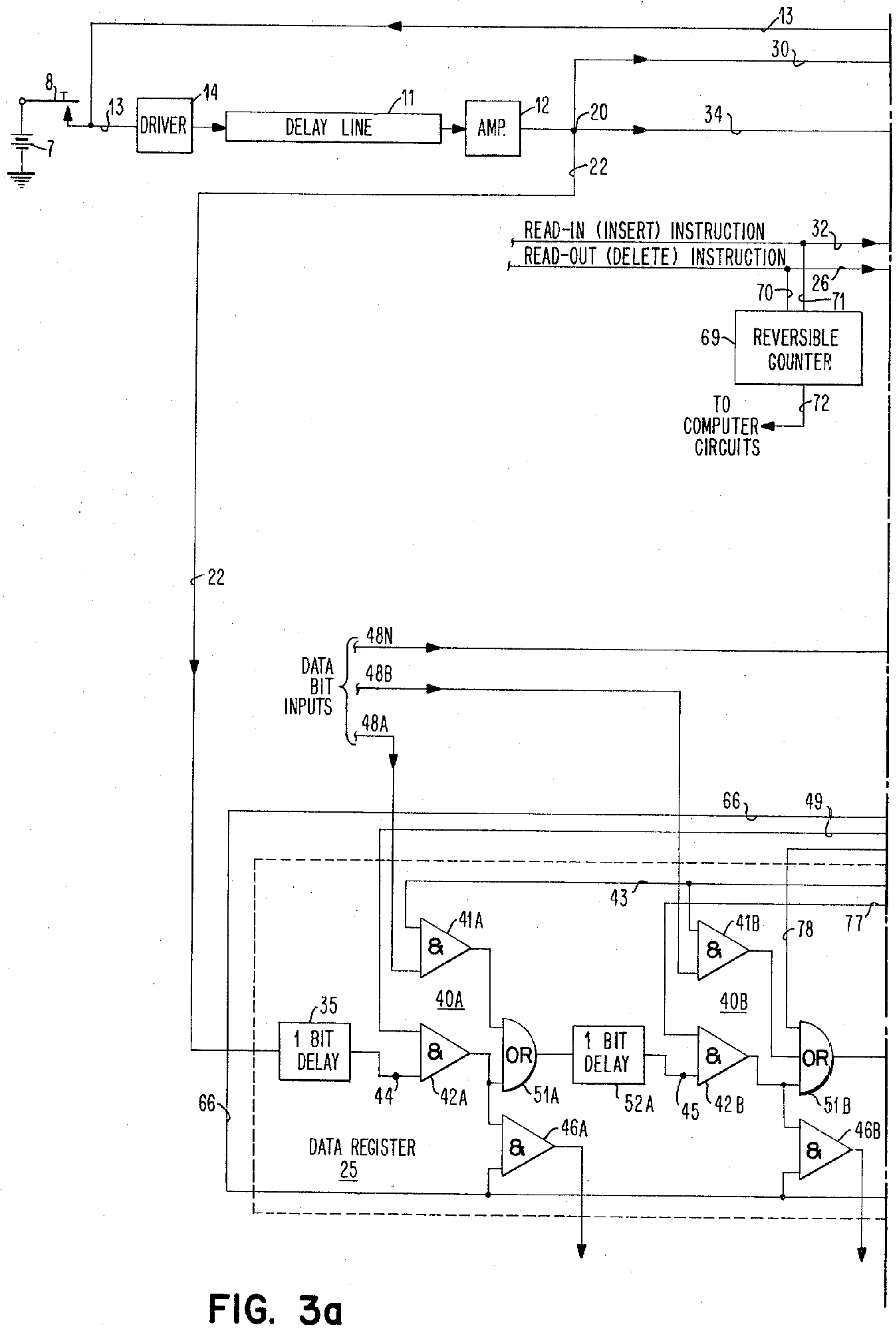
Figure 3B:
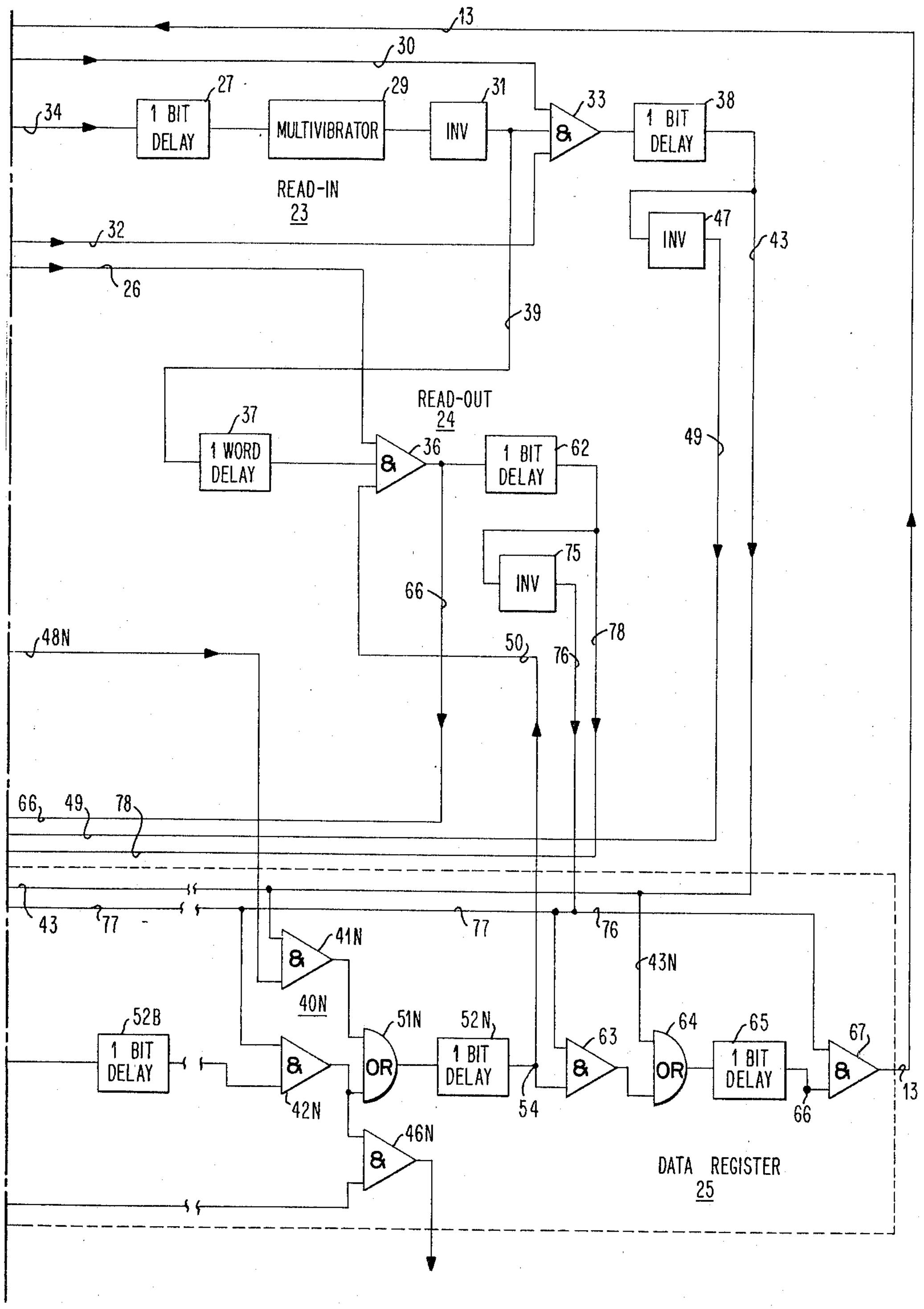

The input-output circuitry 15, which is shown in detail in FIG. 3, includes a read-in or insert control circuit 23 and a read-out or delete control circuit 24. Input-output circuitry 15 also includes the data register 25 which has a number of individual delay devices and logic "AND" and "OR" circuits of any suitable known types which are arranged in stages as will be described hereinbelow. The various "AND" and "OR" circuits in the input-output circuitry are conventional two-input circuits with the exception of "AND" circuit 33 and "AND" circuit 36, which are also of a conventional type but which are three-input circuits, as will be described hereinbelow. The number of stages included in data register 25 is virtually unlimited and as stated above, the number is dependent on the number of bits in each character and the number of characters in a selected word length; for explanation purposes, data register 25 in FIGS. 3*a* and 3*b* is shown as being arranged to process a word consisting of three pulses or bits. In the practical embodiment, a word consisting of five characters and in which each character consists of five bits requires a data register having twenty-five data processing or handling stages.

To initiate the operation, a marker pulse is coupled to the driver 14 when the source of electrical power is connected to the circuit as is well known in the art; this is schematically indicated by the battery 7 and the push-button switch 8 which connects through a portion of line 13 to driver 14. The marker pulse is coupled through the delay line 11, amplifier 12 and lead 22 to the input terminal of data register 25 of the input-output circuitry 15 for conditioning the data register 25 to receive data pulses as will be described hereinbelow. The data pulses are coupled to the data register 25 in parallel; once the pulses are coupled to the data register, the pulses are circulated and recirculated through the various stages of the data register 25, the driver 14, the delay line 11 and the amplifier 12 in series.

Note that the bits which exit from the delay line 11 and amplifier 12 to point 20 (FIGS. 3*a* and 3*b*) are coupled in common to the data register 25 through lead 22 and to the read-in control circuit 23 through leads 30 and 34. More specifically, from the point 20 the lead 22 connects to data register 25, the lead 30 connects to an "AND" circuit 33, and the lead 34 connects to a 1-bit delay device 27 for purposes to be described hereinbelow.

In one embodiment, the 1-bit time delay device 27, as well as the other 1-bit delay devices shown in FIGS. 3*a* and 3*b*, are in fact delay lines which provide an accurate one-bit time delay for operation of the circuit; other devices such as slow acting amplifiers for producing a one-bit time delay could likewise be employed.

The 1-bit delay device 27 couples to a monostable device such as a single shot multivibrator 29 which is arranged to remain in one conducting condition (stay up) for a time interval of two word lengths; i.e., multivibrator 29 is up as long as a stream of bits representing words are being coupled to it from the delay line 11. If a space longer than two word lengths occurs in a stream of bits, multivibrator 29 shifts conducting conditions (goes down) to provide a signal indicating that a space exists in the list of words circulating in the delay line 11, and that the delay line 11 can accept a new word when the beginning of the list of words appears. Thus, when multivibrator 29 goes down, it provides a space-in-list signal which indicates that a space exists between the end and the beginning of the list of words. Note that in the system of the invention, at least one bit or pulse must be included in the code configuration of each word so that the multivibrator 29 will stay up to indicate the presence of that word.

The output signal of multivibrator 29 is coupled to an inverter 31. As stated above, when multivibrator 29 is up indicating the presence of a word, i.e., that a space does not exist at that position in the list, multivibrator 29 will provide a signal to inverter 31 to cause inverter 31 to in turn provide a negative signal to disable "AND" circuit 33; i.e., to cause "AND" circuit 33 to be non-conductive. The "AND" circuit 33 is essentially a three-way "AND" switch; one input signal to "AND" circuit 33 is from inverter 31, a second input signal to "AND" circuit 33 is directly from amplifier 12 and point 20 through lead 30 as stated above; and, a third input signal to "AND" circuit 33 is a read-in or insert instruction signal coupled through lead 32 from suitable computer circuits, not shown. When the multivibrator 29 goes down indicating that there is a space in the list into which a word can be inserted, inverter 31 provides a positive signal to tend to enable "AND" circuit 33. Thus, since as discussed above, a marker pulse appears immediately after a space in the list, and if at that given period, the computer circuitry couples an insert instruction signal through lead 32 to "AND" circuit 33, the coincidence of its three input signals enables or causes "AND" circuit 33 to conduct to provide a signal, a read-in signal, through a 1-bit time delay device 38 and lead 43 to activate the various stages in the data register 25, as will now be described.

Each of the stages 40A, 40B . . . 40N of the data register 25 are similar and each stage includes an input "AND" circuit generally labeled 41 into which the data bit inputs are coupled. Each storage 40A, 40B . . . 40N also includes a second or circulating channel "AND" circuit generally labeled 42; a third or output "AND" circuit generally labeled 46, which is utilized to read the information out of the data register as will be described hereinbelow; and, an "OR" circuit generally labeled 51.

The output signals of each of the "AND" circuits 41A, 41B . . . 41N are coupled as one input to the "OR" circuits 51A, 51B . . . 51N respectively; the output signals of the "AND" circuits 42A, 42B . . . 42N are coupled as the other input signals to the "OR" circuits 51A, 51B . . . 51N, and also as input signals to the "AND" circuits 46A, 46B . . . 46N respectively. A 1-bit time delay device generally labeled 52 is positioned between each of the stages 40A, 40B . . . 40N of the data register 25 to provide a 1-bit interval between the input data pulses. The output signals of "OR" circuits 51A, 51B . . . 51N are coupled to 1-bit time delay devices 52A, 52B . . . 52N respectively.

In operation, the recirculating bit or pulse data in the delay line 11 is coupled through the amplifier 12 and lead 22 to the 1-bit time delay device 35 at the input of the data register 25 and thence to the "AND" circuit 42A in the first stage 40A of the data register 25. The recirculating bit or pulse data proceeds serially through the first stage 40A and the 1-bit time delay device 52A to the second stage 40B and the 1-bit time delay device 52B and thence through the succeeding stages . . . 40N of the data register 25 and the associated time delay devices. More specifically, starting from the output side of the delay line 11, the recirculating channel for the data is traced through amplifier 12, lead 22, 1-bit delay device 35, "AND" circuit 42A, "OR" circuit 51A, 1-bit time delay device 52A, "AND" circuit 42B, "OR" circuit 51B, 1-bit time delay device 52B, "AND" circuit 42N, "OR" circuit 51N, 1-bit time delay 52N, "AND" circuit 63, "OR" circuit 64, 1-bit time delay 65, "AND" circuit 67 and thence through lead 13 back to the driver 14 and the delay line 11. The bit or pulse data is thus recirculated serially through the delay line 11 and data register 25. As will be described more fully hereinbelow, the circuits of the data recirculating channel are normally conductive; i.e., the circuits are enabled or in a condition to pass the bits or pulses coupled to the data register 25.

The structure of the other circuits and devices shown in FIGS. 3*a* and 3*b* and the electrical connections therebetween will be described hereinbelow in conjunction with the description of the operation of the circuit of FIGS. 3*a* and 3*b*.

*Read-in or insert*

The read-in or insert operation is as follows: As indicated above, during a read-in operation, a read-in or insert instruction from suitable computer circuits, not shown, is provided through lead 32 as an enabling signal to "AND" circuit 33 in the read-in circuit 23 to indicate that data bits or pulses are available to be inserted or read into data register 25; and more specifically, that data bits or pulses representing a word are available to be coupled through respective lines 48A, 48B . . . 48N to "AND" circuits 41A, 41B . . . 41N of stages 40A, 40B . . . 40N of the data register 25. When there is a space of at least two words length in the list of words being circulated in the delay line 11, the space, that is, the lack of a bit or pulse within a given time period will permit the multivibrator 29 to shift down, and a signal is coupled through inverter 31 to tend to enable "AND" circuit 33. When the marker pulse at the head of the list of words being circulated in the delay line 11 arrives at the input of "AND" circuit 33 via lead 30, it also tends to enable "AND" circuit 33. These three enabling input signals, i.e., the read-in instruction signal, the space-in-list signal, and the marker pulse, applied coincidentally to "AND" circuit 33 cause "AND" circuit 33 to provide a control or read-in signal through the 1-bit time delay device 38 and lead 43 as one input signal to "AND" circuits 41A, 41B . . . 41N to condition or enable these latter circuits to receive input data bits. The lead 43 couples in parallel to each of the "AND" circuits 41A, 41B . . . 41N. The input data bits are coupled as the other input signal to each of "AND" circuits 41A, 41B . . . 41N; thus, these circuits are made conductive to connect the data bits to "OR" circuits 51A, 51B . . . 51N respectively, in the recirculating channel of the data register 25. Note that all of the stages 40A, 40B . . . 40N of data register 25 are energized concurrently such that data bits are entered concurrently or in parallel into the data register 25; that is, a complete word (represented here by the three bits) is read into the data register 25 during a read-in operation. As indicated above, the 1-bit time delay devices 52A, 52B . . . 52N, which are connected between or intermediate the various stages of data register 25, provide a one-bit time interval between the data bits to position the data bits in proper position and time relation.

As also noted above, when a word is read in or inserted into the data register, this word becomes the top word in the list, and in order to indicate that this is the new top word of the list, a marker pulse must now be inserted ahead of this new top word and the previous or old marker pulse must be deleted. This is accomplished as follows:

The read-in signal from "AND" circuit 33, which is connected through 1-bit delay device 38 and lead 43 to condition or tend to enable "AND" circuits 41A, 41B . . . 41N to receive data bits, is also coupled through lead 43 and lead 43N to "OR" circuit 64 in the data recirculating channel of data register 25 to become a new marker pulse. Note that the leading data bit is inserted into stage 40N and the new marker pulse is inserted into "OR" circuit 64 a one-bit time interval ahead of the leading data bit; the separation between the new marker pulse and the leading data bit is provided by 1-bit delay device 52N.

At the time that the new marker pulse is inserted ahead of the new top word in the list, the previous marker pulse must be deleted as follows: The previous marker pulse appearing at point 20 was used to activate the read-in circuits 23 through lead 30, and at the same time, this previous marker pulse was coupled from point 20 through lead 22 to the 1-bit time delay device 35 in the data register 25. To cancel this previous marker pulse, the read-in signal from "AND" circuit 33 is coupled through the 1-bit time delay device 38 and an inverter 47 (where the pulse is inverted so as to function as a diasabling signal) through a lead 49 to disable "AND" circuit 42A in the first stage 40A of data register 25. The previous or old marker pulse goes through the 1-bit time delay device 35 and appears at point 44, i.e., at the output side of delay device 35 a one-bit time interval later. Also, the read-in signal at the output of "AND" circuit 33 is delayed one-bit time interval by the 1-bit time delay device 38 before it is coupled through inverter 47 and lead 49 to "AND" circuit 42A; the disabling signal from inverter 47 thus appears at one input point, not numbered, of "AND" circuit 42A at the same time as the previous or old marker pulse appears at point 44, that is, at the other input point of "AND" circuit 42A. Therefore, "AND" circuit 42A is momentarily disabled (rendered nonconductive) or blocked and this will cause the previous or old marker pulse to be effectively deleted. When next, the data bit which follows the previous or old marker pulse appears at the input point 44 of "AND" circuit 42A a one-bit time interval later, the disabling signal from inverter 47 coupled to the other input point of "AND" circuit 42A will have been terminated. The "AND" circuit 42A will now be enabled to pass any pulse received at point 44, and hence, the data bit following the marker pulse (and all the succeeding data bits) will continue through the afore-mentioned circulating channel of the data register 25; as stated above, the various circuits in the circulating channel are normally in a conductive condition to pass all the bits or pulses which are received in the data register 25.

*Read-out or delete*

When a read-out or delete instruction signal pulse is received from the computer circuitry, as from a latch circuit, not shown, it is coupled through lead 26 to "AND" circuit 36 in the read-out circuit 24. The "AND" circuit 36 is a three-way "AND" switch similar to "AND" circuit 33; one input signal to "AND" circuit 36 is the delete instruction signal; a second input signal to "AND" circuit 36 is coupled from inverter 31 through lead 39 and a one-word time delay device 37; and, a third input signal to "AND" circuit 36 is coupled through lead 50 from point 54 in the data register 25. Note that the second input signal to "AND" circuit 36 is the space-in-list signal from multivibrator 29 (through one-word delay device 37) and this second signal input will tend to enable "AND" circuit 36 after a one-word time delay; the space-in-list signal indicates to the read-out circuit 24 that the beginning of the list is coming up. The third input signal coupled to "AND" circuit 36 from point 54 in the output end of data register 25 is effectively the marker pulse. Note that the marker pulse is coupled from point 54 to "AND" circuit 36 after the marker pulse has traversed the various stages 40A, 40B . . . 40N and the 1-bit delay devices 52A, 52B . . . 52N of the data register; the marker pulse takes one-word time to traverse these units.

Thus, "AND" circuit 36 is enabled to pass a read-out or control signal to the data register 25 one-word time interval after the marker pulse enters the data register 25; and at a time when the data bits comprising a word immediately succeeding the marker pulse are in position in "AND" circuits 42A, 42B . . . 42N of the various stages 40A, 40B . . . 40N to be read out. Note that the words being recirculated traverse the data register 25 in a serial by bit manner; thus, for example, in order to read a complete word at a given time out, the reading operation must be delayed until the last bit in the word is in position to be read out in stage 40A. This is the reason that the one-word delay unit 37 is used to delay the enabling of the "AND" circuit 36; i.e., to permit all the bits of a completed word to be in position in the data register 25 to be read out before "AND" circuit 36 is enabled. The marker pulse thus functions to activate the output gating means of the data register 25 as will now be described.

Coincidence of the three above-mentioned input signals at "AND" circuit 36 will cause a read-out or gating signal to be provided from "AND" circuit 36 through lead 66 to enable, in parallel, the "AND" circuits 46A, 46B . . . 46N of stages 40A, 40B . . . 40N in the data register 25. Coincidence of the read-out signal from "AND" circuit 36 and the data bit present at each of output "AND" circuits 42A, 42B . . . 42N of the stages 40A, 40B . . . 40N will, in effect, cause each of the data bits to be coupled (gated out) through the respective "AND" circuits 46A, 46B . . . 46N to provide data in parallel to the utilization circuitry, not shown.

During the time the read-out operation occurs, the marker pulse appearing at point 54 will pass through "AND" circuit 63 and "OR" circuit 64. One-bit time interval later, the marker pulse will appear at input point 66 of "AND" circuit 67; concurrently, the read-out signal provided by "AND" circuit 36 is coupled through a 1-bit delay device 62, an inverter 75 (where it is inverted to function as a disabling signal) and lead 76 to the other input point, not numbered, of "AND" circuit 67; this disabling signal will render "AND" circuit 67 nonconductive and thus will cause the marker pulse appearing at input point 66 of "AND" circuit 67 to be deleted or erased. Also, a one-bit time interval later, the data bits comprising the word which has just been read out have advanced through the immediate 1-bit delay device; for example, the data bit which was just read out from stage 40A has proceeded to input point 45 of "AND" circuit 42B in stage 40B. At this time, the disabling signal from inverter 75 is coupled through leads 76 and 77 to disable "AND" circuits 42B . . . 42N and "AND" circuit 63 to thus delete the data word which has just been read out.

Now that a group of bits representing a complete word has been read out and deleted and the marker pulse has been erased, a new marker pulse must be inserted ahead of the succeeding word in the list being circulated in the delay line 11. Note that as the read-out operation of the data register was being performed, the next bit of data in the delay line was available at the input side of the 1-bit delay device 35, that is, at the input end of the data register 25. One-bit time later, at the time the previous marker pulse is being deleted at the output of the data register 25, as explained above, the first bit of data in the succeeding word in the list is available at input point 44 of "AND" circuit 42A of stage 40A. The new marker pulse must be inserted a one-bit time ahead of this first bit of data in this new top word in the list. To do this, the read-out signal from the "AND" circuit 36 is coupled through 1-bit time delay device 62 and lead 78 to be an input pulse to "OR" circuit 51B. This will cause a new marker pulse to be inserted a one-bit time interval (the time delay of 1-bit time delay device 52A) ahead of the first data bit in the succeeding word.

The signal from inverter 47 appearing on lead 49 is normally an enabling pulse which permits "AND" circuit 42A to conduct and pass a signal whenever a data or marker pulse signal is received at the other input of "AND" circuit 42A. Likewise, the signal from inverter 75 appearing on lead 76 is normally an enabling pulse which permits "AND" circuits 42B . . . 42N to conduct whenever a data or marker pulse signal is received at the other input of "AND" circuits 42B . . . 42N. Thus, any data bits received from the delay line 11 and amplifier 12 will be passed, i.e., proceed through the various stages 40A, 40B . . . 40N of the data register 25. The output signal from the data register 25 is taken from "AND" circuit 67 and is coupled through line 13 back to the driver 14 of the delay line 11 to be recirculated. The data bits will be recirculated in the delay line until an insert instruction or a delete instruction is received at which time data bits are inserted or deleted is discussed above.

A reversible counter 69 of any suitable type such as, for example, the type shown in U.S. Patent No. 2,968,003 to D. H. Apgar, entitled "Reversible Electronic Counter" and assigned to the same assignee as the present invention, is also connected to the leads 26 and 32 through leads 70 and 71 respectively. The reversible counter 69 counts the number of read-in instruction signals and counts (subtracts) the number of read-out instruction signals coupled to the read-in and read-out circuits and thereby keeps a running count of the number of words in the list of words being circulated in the delay line 11 and data register 25. The counter is arranged to provide an output signal to the associated computer circuits through lead 72 when the number of words in the list of words reaches a desired limit to inhibit any further read-in instruction signals and thus inhibit any additional words from being inserted into the list of words.

It will be understood that the circuit of the invention could likewise be employed in other circulating types of storage devices such as drums and discs which include means for erasing data which is read out.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for providing a push-down list or last-in-first-out type of storage control for a list of data being circulated in a dynamic storage device comprising in combination:

(a) a data register;
(b) means connecting said data register to said storage device for serially circulating the list of data through said data register and said storage device;
(c) means for selectively inserting or reading in new data into said data register to position said new data at the beginning of said circulating list;
(d) means including said data register for selectively deleting or reading out data from the beginning of said circulating list;
(e) means for inserting a marker pulse at the head of said circulating list of data;
(f) means for effectively repositioning said marker pulse when new data is inserted at the beginning of said circulating list; and,
(g) means for effectively repositioning said marker pulse when data is deleted from the beginning of said circulating list.

2. A circuit for providing a push-down list or last-in-first-out type of storage control for a list of data words comprising groups of bits being circulated through a delay line comprising in combination:

(a) a data register;
(b) means connecting said data register to said delay line for serially circulating the data words and marker pulse through said data register and said delay line;

(c) means for selectively inserting or reading in a new data word into said data register to position said new word at the beginning of said circulating list;

(d) means including said data register for selectively deleting or reading out data words in parallel from the beginning of said circulating list;

(e) means for activating said data register inserting a marker pulse ahead of said circulating list of data;

(f) means for activating said data register for inserting a new marker pulse at the beginning of said list when new data is inserted into said circulating list and deleting the previous marker pulse; and, (g) means for activating said data register for inserting a new marker pulse ahead of the data remaining in said circulating list when data is deleted from said circulating list and deleting the previous marker pulse.

3. A delay line circuit responsive to read-in instruction signals for controlling the insertion of words of data comprising groups of bits into a list of data words in a last-in-first-out sequence, the combination comprising:

(a) means for serially circulating data through said delay line and said data register;

(b) a control circuit for activating said data register for inserting a marker pulse at the beginning of said list of words;

(c) means for inserting groups of data bits representing a data word into said data register in parallel;

(d) means for detecting a space in said list of words and providing a space-in-list signal;

(e) means for detecting said marker pulse following said space and providing a marker pulse signal;

(f) means responsive to the coincidence of said space-in-list signal, said marker pulse signal, and a read-in instruction signal for activating said data register to read in a group of bits representing a new beginning word into said data register in the space immediately ahead of the beginning word in said list; and, (g) means for deleting the marker pulse and inserting a new marker pulse ahead of the new beginning word in the list.

4. A delay line circuit responsive to read-out instruction signals for controlling the deletion of words of data comprising groups of bits from a list of data words in a last-in-first-out sequence, the combination comprising:

(a) means for serially circulating data through said delay line and said data register;

(b) a control circuit for activating said data register for inserting a marker pulse at the beginning of said list of words;

(c) means for inserting groups of data bits representing a word into said data register in parallel;

(d) means for detecting a space in said list of words and providing a space-in-list signal;

(e) means for detecting said marker pulse following said space and providing a marker signal;

(f) means for channeling said marker pulse through said data register;

(g) means for providing a marker pulse signal in response to the presence of a marker pulse at a selected position in said data register;

(h) delay means for delaying said space-in-list signal by one word interval;

(i) means responsive to the coincidence of said delayed space-in-list signal, said marker pulse signal, and a read-out instruction signal for activating said data register to read out the group of bits representing the beginning word in said list;

(j) means for deleting said group of bits representing said beginning word after said group of bits are read out; and, (k) means associated with said control circuit for deleting the marker pulse and inserting a new marker pulse at the beginning of the succeeding word in the list.

5. In a delay line for providing dynamic storage of a push-down list in which data words comprising groups of bits are read in and read out in a last-in-first-out sequence with a marker pulse at the beginning of the list, the combination comprising:

(a) input-output circuitry including data registers having a plurality of stages, said stages arranged to read in and read out data bits in parallel;

(b) means connecting said data register to said delay line for serially circulating said data bits through said delay line and said data register;

(c) means in said data register selectively responsive to read-in and to read-out instruction signals;

(d) means for activating said data register for inserting a marker pulse at the beginning of the list;

(e) means in said input-output circuitry for detecting the presence of said marker pulse and providing a first control signal in response thereto;

(f) means in said input-output circuitry for detecting that a space exists in said list and providing a second control signal in response thereto;

(g) said data register being activated to read in a group of bits representing a word at the beginning of said list in response to coincidence of said first control signal, said second control signal and said read-in intruction signal;

(h) said data register being concurrently activated to delete said marker pulse and to insert a new marker pulse at the beginning of the newly inserted word in said list;

(i) means in said input-output circuitry for providing a third control signal in response to the presence of a marker pulse at a selected stage in said data register to indicate that a group of bits representing a word in said list are present in said data register;

(j) means for selectively delaying said second control signal;

(k) means in said input-output circuitry for developing a gating signal in response to coincidence of said third control signal, said delayed second control signal, and said read-out instruction signal;

(l) first means for coupling said gating signal to activate said data register to read out said word in said data register;

(m) means for inverting and delaying said gating signals; and, (n) means for coupling said inverted and delayed gating signal to activate said data register to delete said marker pulse and insert a new marker pulse at the beginning of the succeeding word of said list and to concurrently delete the word that was read out from said list.

6. In a delay line for providing dynamic storage of a push-down word list type in which data words comprising groups of bits are read in and read out in a last-in-first-out manner, the combination comprising:

(a) a delay line;

(b) a data register;

(c) control circuit means including read-in and read-out control portions;

(d) means for connecting said delay line and said data register for circulating data through said delay line and said data register in series;

(e) said data register comprising a plurality of stages corresponding to the number of bits in a data word;

(f) means for inserting a marker pulse into said data register at the beginning of said list of words;

(g) one-bit time delay means connected between each of said stages of said register for positioning said input data bits in spaced relation;

(h) means for connecting said delay line to said read-in and read-out portions of said conrol circuit means;

(i) a monostable device in said control circuit means for providing a space-in-list signal when a space or time interval of at least two-word lengths occurs in said list;

(j) means in said read-in portion of said control circuit means which are responsive to the coincidence of a read-in instruction signal, said space-in-list signal, and said marker pulse to thereby provide an enabling signal to energize in parallel said data register stages to receive a group of data bits representing a word;

(k) said control circuit means providing a new marker pulse to said data register a one-bit time interval position ahead of the leading bit in said word being inserted into said data register;

(l) said control circuit means concurrently providing a disabling signal to momentarily block a selected stage in said data register to delete the previous marker pulse;

(m) delay means in said read-out portion of said control circuit means for delaying said space-in-list signal by one-word time interval;

(n) means responsive to the coincidence of said read-out instruction signal, said delayed space-in-list signal and the presence of a marker pulse in a selected stage in said data register to thereby provide a read-out or gating signal in parallel to said data register stages to read out a group of bits representing a word;

(o) delay means for providing a disabling signal a one-bit time interval after said group of bits have been read out to block said data register to delete said group of bits which were read out and said marker pulse; and, (p) means for inserting a new marker pulse at the beginning of the succeeding word in said list.

7. In a delay line for providing dynamic storage of the push-down list type in which data words comprising groups of bits are read in and read out in a last-in-first-out sequence and wherein a marker pulse precedes the first word in the list, the combination comprising:

(a) a delay line;

(b) a data register having a data circulating channel and having its input connected to the output of said delay line and its output connected to the input of said delay line, whereby data words are serially circulated through said delay line and said data register;

(c) means for inserting a marker pulse at the beginning of said list of data words;

(d) means for detecting a space available for storing data in said list and providing a space-in-list signal;

(e) said data register including a plurality of stages, each stage having a read-in "AND" circuit, a read-out "AND" circuit, and a data circulating channel "AND" circuit;

(f) a one-bit time delay device connected intermediate each of said stages for positioning said data bits in one-bit time spaced intervals;

(g) means for coupling groups of data bits into said read-in "AND" circuits in parallel;

(h) a read-in control circuit;

(i) means for selectively coupling a read-in signal to said read-in control circuit;

(j) "AND" circuit means in said read-in control circuit arranged to be activated by the coincidence of said read-in signal, a marker pulse and a space-in-list signal for enabling said read-in "AND" circuits in said data register to read in said data bits in parallel into said read-in "AND" circuits;

(k) means in said read-in control circuit for providing a disabling signal to said data circulating channel to momentarily block said circulating channel "AND" circuit in said first stage for deleting said marker pulse;

(l) means coupling a signal from said read-in control circuit to insert a new marker pulse in said recirculating channel a one-bit time interval ahead of the leading data bit being inserted into said data register;

(m) a read-out control circuit including a one-word delay device;

(n) means for coupling said space-in-list signal through said one-word time delay device to said data register;

(o) means for selectively coupling a read-out signal to said read-out control circuit;

(p) "AND" circuit means in said read-out control circuit arranged to be activated by the coincidence of said read-out signal, said space-in-list signal delayed by one-word time, and a marker pulse present in said data register to provide a gating signal to enable said read-out "AND" circuits in said data register to read out in parallel a group of data bits representing a word;

(q) means for inverting and delaying said gating signal;

(r) means for coupling said inverted and delayed gating signal to momentarily disable said recirculating channel in said data register to momentarily block said channel to delete the previous marker pulse and the groups of bits which were read out; and, (s) means for concurrently coupling an enabling signal to said data register to insert a new marker pulse a one-bit time interval ahead of the leading bit in the succeeding word in said list.

8. In a delay line for providing dynamic storage of the push-down list type in which data words comprising groups of bits are read in and read out in a last-in-first-out sequence, the combination comprising:

(a) a delay line;

(b) control circuitry means including read-in and read-out control circuits;

(c) a data register having a data circulating channel and having its input connected to the output of said delay line and its output connected to the input of said delay line, whereby data words are serially circulated through said delay line and said data register;

(d) means for connecting the output of said delay line to said read-in and read-out control circuits;

(e) means for inserting a marker pulse at the beginning of said list of data words;

(f) a monostable device in said control circuit for providing a space-in-list signal when a time interval of at least two-word lengths occurs in said list;

(g) said data register including a plurality of stages corresponding to the number of bits in a data word, each stage having a read-in "AND" circuit, a read-out "AND" circuit, and a data circulating channel "AND" circuit;

(h) a one-bit time delay device connected intermediate each of said stages for positioning said data bits in one-bit time spaced intervals;

(i) means for coupling data bits into said read-in "AND" circuits in parallel;

(j) means for selectively coupling a read-in signal to said read-in control circuit;

(k) said read-in control circuit arranged to be activated by the coincidence of said read-in signal, a marker pulse and a space-in-list signal to provide an enabling signal to enable said read-in "AND" circuits to read in data bits in parallel into said data register;

(l) first and second delay devices;

(m) first and second inverters;

(n) means in said read-in control circuit for coupling said enabling signal through said first delay device and said first inverter as a disabling signal to said data circulating channel to momentarily block said data circulating channel "AND" circuit in said first stage for deleting said marker pulse;

(o) means in said read-in control circuit for coupling said enabling signal through said first delay device to insert a new marker pulse in said recirculating channel a one-bit time interval ahead of the leading data bit inserted into said data register;

(p) said read-out control circuit including a one-word delay device;

(q) means for coupling said space-in-list signal through said one-word delay device;

(r) means for selectively coupling a read-out signal to said read-out control circuit;

(s) said read-out control circuit arranged to be activated by the coincidence of said read-out signal, said space-in-list signal delayed by one-word time, and a marker pulse present in said data register to provide a gating signal to enable said read-out "AND" circuits to read out a group of data bits representing a word in parallel;

(t) means in said read-out control circuit for coupling said gating signal through said second delay device and said second inverter to said recirculating channel to momentarily block said channel to delete the previous marker pulse and the groups of bits which were read out a one-bit time interval earlier; and, (u) means for coupling said gating signal through said second delay device to said recirculating channel to insert a new marker pulse a one-bit time interval ahead of the leading bit in the succeeding word in said list.

No references cited.

ROBERT C. BAILEY, *Primary Examiner.*

G. D. SHAW, *Assistant Examiner.*